(12) United States Patent
Zhou et al.

(10) Patent No.: US 7,730,101 B2
(45) Date of Patent: Jun. 1, 2010

(54) IMPLEMENTING A TREE DATA STORAGE STRUCTURE IN A DISTRIBUTED ENVIRONMENT

(75) Inventors: Lidong Zhou, Sunnyvale, CA (US); Chandramohan A. Thekkath, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 11/149,656

(22) Filed: Jun. 10, 2005

(65) Prior Publication Data

US 2006/0282481 A1    Dec. 14, 2006

(51) Int. Cl.
G06F 7/00 (2006.01)
G06F 17/30 (2006.01)
(52) U.S. Cl. .................................. 707/797; 707/802
(58) Field of Classification Search .................. None
See application file for complete search history.

(56) References Cited

U.S. PATENT DOCUMENTS

| | | | |
|---|---|---|---|
| 5,243,596 A * | 9/1993 | Port et al. .................. 370/231 |
| 5,319,780 A * | 6/1994 | Catino et al. .................. 707/8 |
| 5,742,813 A * | 4/1998 | Kavanagh et al. ............. 707/8 |
| 5,749,095 A * | 5/1998 | Hagersten .................. 711/141 |
| 5,764,918 A * | 6/1998 | Poulter ..................... 709/236 |
| 6,151,659 A * | 11/2000 | Solomon et al. ........... 711/114 |
| 6,473,849 B1 * | 10/2002 | Keller et al. ................. 712/30 |
| 6,728,244 B1 * | 4/2004 | Takabatake ................ 370/392 |
| 7,190,743 B2 * | 3/2007 | Learned ..................... 375/340 |
| 7,263,590 B1 * | 8/2007 | Todd et al. ................. 711/165 |
| 7,269,604 B2 * | 9/2007 | Moore et al. ............... 707/200 |
| 2004/0181547 A1 * | 9/2004 | Mazzagatti .............. 707/104.1 |

OTHER PUBLICATIONS

Microsoft Computer Dictionary, Fifth edition, p. 118-119, published 2002.*
Lehman, P.L. et al., "Efficient Locking for Concurrent Operations on B-Trees", *ACM Transactions on Database Systems*, Dec. 1981, 6(4), 650-670.
MacCormick, J. et al., "Boxwood: Abstractions as the Foundation for Storage (e) Infrastructure", *Microsoft Research Silicon Valley*, 8 pages.
Sagiv, Y., "Concurrent Operations on B*-Trees with Overtaking", *Journal of Computer and System Sciences*, 1986, 33, 275-296.

* cited by examiner

*Primary Examiner*—Charles Rones
*Assistant Examiner*—Daniel Kuddus
(74) *Attorney, Agent, or Firm*—Woodcock Washburn LLP

(57) ABSTRACT

Tree data storage structures are implemented on respective computers in a distributed environment, such as on a network, so that information associated with nodes of one computer's tree data storage structure may be read or written to by another computer in the network. To promote efficiency, a cache may be employed on the computers in the network such that each computer caches information associated with nodes of tree data storage structures located on the computers in the network. A lock service may implement a caching protocol to provide efficient concurrency of caching operations while ensuring that current information associated with the nodes is available to all computers in the network.

11 Claims, 5 Drawing Sheets

US 7,730,101 B2

IMPLEMENTING A TREE DATA STORAGE STRUCTURE IN A DISTRIBUTED ENVIRONMENT

RELATED APPLICATIONS

This application is related to U.S. patent application Ser. No. 11/149,593 filed on Jun. 10, 2005 entitled "Performing A Deletion Of A Node In A Tree Data Storage Structure," filed herewith and incorporated by reference in its entirety.

FIELD OF THE INVENTION

The invention generally relates to data storage and specifically to tree data storage structures in a distributed environment.

BACKGROUND OF THE INVENTION

Tree data storage structures such as B-trees and variations of B-trees (e.g., B*trees, B+trees, B–link trees) and others are used for storing large files of information on secondary storage and for supporting insertion, lookup, deletion, and enumeration operations. Such tree data storage structures are typically implemented on individual computers, with each computer satisfying operations involving its structure without regard to information indexed by tree data storage structures on other computers. That is, each computer includes its own tree data storage structure and does not, for example, retrieve information contained in nodes of a tree data storage structure located on a second computer even if the computers are communicatively coupled.

For purposes of fault tolerance, performance, scalability, and information sharing, it is desirable to utilize tree data storage structures in a distributed environment such as a cluster of machines on a network. Implementation of tree data storage structures in a distributed environment should promote efficient information sharing through efficient and highly concurrent B-Tree operations.

SUMMARY OF THE INVENTION

The invention includes implementing a tree data storage structure in a distributed environment, such as a cluster of machines on a network. Two or more computers in such a network may be communicatively coupled and each may include nodes of a tree data storage structure. One computer may include nodes of the tree data storage that are not included on a second computer in the network. The second computer, however, may read or write to nodes stored on the first computer. Additionally or alternatively, a node of the tree data storage structure may be stored on more than one computer within the network.

To promote efficiency, a cache may be employed on the computers in the network. That is, each computer may cache information associated with nodes of tree data storage structures located on the computers in the network. When a first computer desires information associated with a node on a second computer, the information may be cached on the first computer. Once cached, the information may be read or written to depending on a concurrency protocol instituted for such caching in the network. A lock service may be associated with each computer and may implement the caching protocol to ensure efficient concurrency of caching operations while ensuring that current information associated with the nodes is available to all computers in the network.

BRIEF DESCRIPTION OF THE DRAWINGS

The foregoing summary and the following detailed description of the invention are better understood when read in conjunction with the appended drawings. Embodiments of the invention are shown in the drawings, however, it is understood that the invention is not limited to the specific methods and instrumentalities depicted therein. In the drawings.

DETAILED DESCRIPTION OF ILLUSTRATIVE EMBODIMENTS

Example Computing Environment

Figure 1:
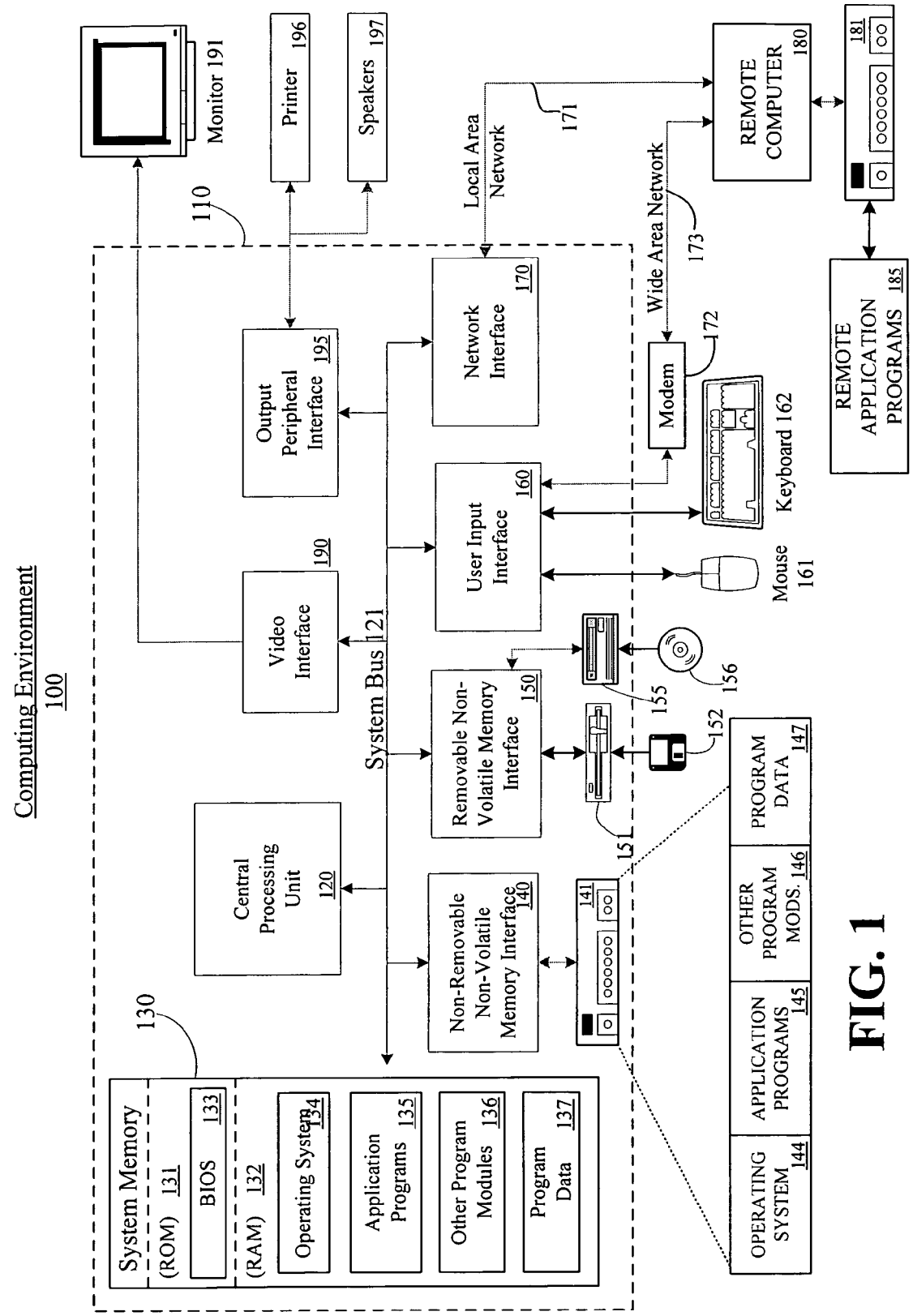
FIG. 1 is a block diagram showing an example computing environment in which aspects of the invention may be implemented.

FIG. 1 and the following discussion are intended to provide a brief general description of a suitable computing environment 100 in which an example embodiment of the invention may be implemented. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The term "data" refers to any information of any form, including commands, transfers, notifications, or requests. The terms "program code" and "code" refer to any set of instructions that are executed or otherwise processed by a processor.

The term "tree data storage structure" refers to any storage system or structure such as binary trees, B-trees or variants of B-trees, or other similar structures that provide an indexing of stored information. The tree data storage structure includes nodes branching out from a root node, where each node may include information consisting of one or more keys, an operation (such as less-than or greater-than) and/or information, typically referred to as a "pointer," regarding a descendent node. Such structures may be used for storing large files of information and such information may be stored on a secondary storage device such as a disk. The term "identifier" refers to a form of or a substitute for a pointer of a node of a tree data storage structure that may be used to identify only one past or present node of a tree data storage structure and is used to map the node to a location in persistent storage. The term "cache" refers to a high-speed storage mechanism that may be either a reserved section of main memory or an independent high-speed storage device.

The term "operation" refers to functions performed using a tree data storage structure such as, for example, reading or writing to a node of the structure. The term "lock" refers to a function used in multi-computer or network systems to maintain file or information integrity or consistency by preventing conflicting operations. That is, if an operation is being performed, then no conflicting operations will be allowed. A lock acquisition may be required before each operation to ensure that operations do not conflict.

While a general purpose computer is described below, this is merely one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 illustrates an example of a suitable computing system environment 100 in which the invention may be implemented, although as made clear above, the computing system environment 100 is only one example of a suitable computing environment and is not intended to suggest any limitation as to the scope of use or functionality of the invention. Nor should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a central processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

The system memory 130 includes computer storage media in the form of volatile and/or nonvolatile memory such as ROM 131 and RAM 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A computer 110 or other client device can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Example Embodiments

Figure 2:
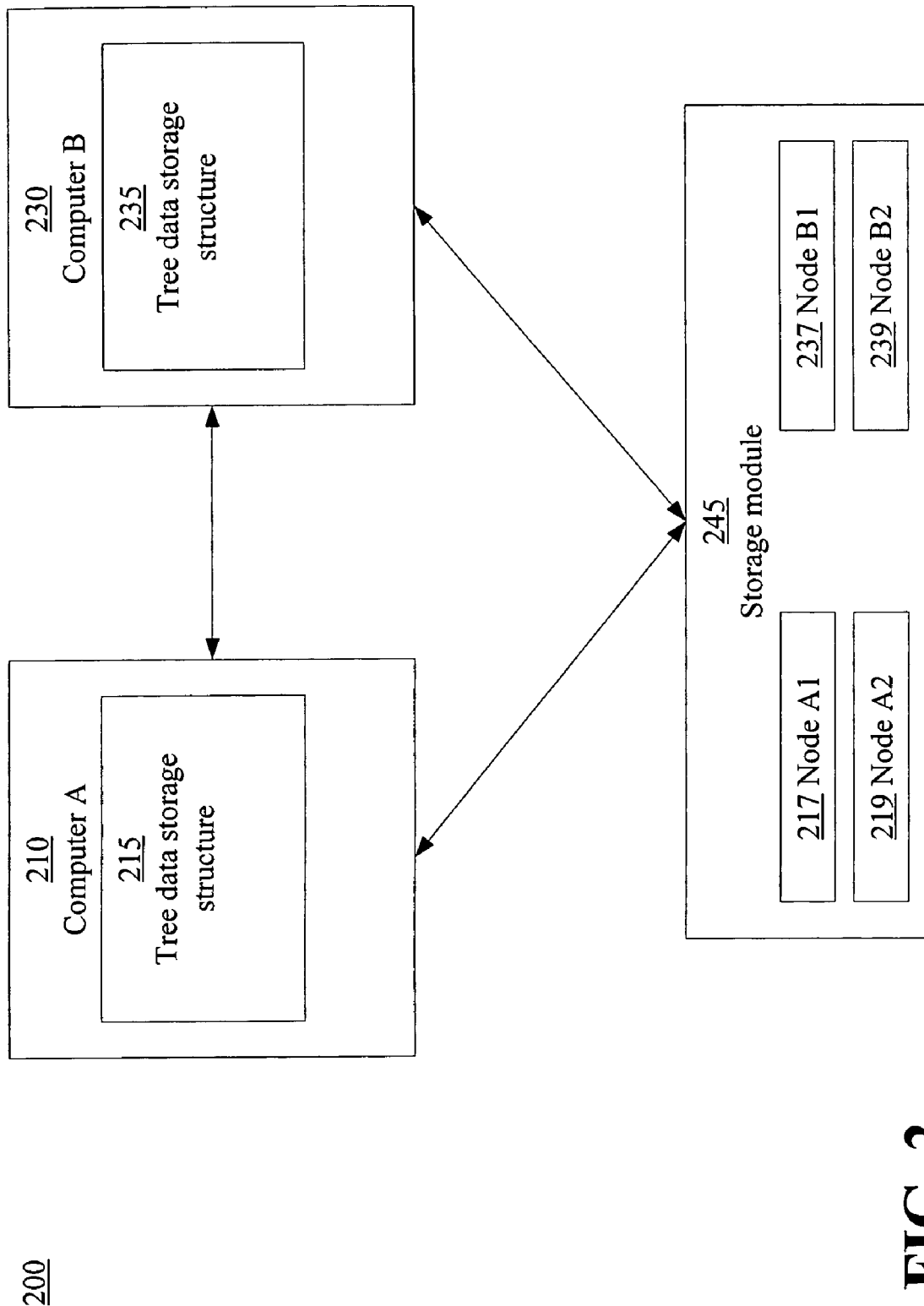
FIG. 2 is a block diagram if an example system for implementing a tree data storage structure in a distributed environment, according to the invention.

FIG. 2 is a block diagram of an example embodiment of a system 200 for using a tree data storage structure in a distributed environment. The system 200 may include a computer A 210 communicatively coupled, that is, in communication with, a computer B 230. The computers 210, 230 each may be the computer 110 described with regard to FIG. 1. The computers 210, 230 may be part of a network, and the network may include other computers or server computers (not shown) that may also use a tree data storage structure in the distributed environment. The system 200 may include a storage module 245 as disclosed and described in U.S. patent application Ser. No. 11/149,593 filed on Jun. 10, 2005 entitled "Performing A Deletion Of A Node In A Tree Data Storage Structure" herein incorporated by reference in its entirety. The storage module 245 may be a virtualized, distributed, and reliable storage layer, providing an interface that has an appearance of a local storage layer. The storage module 245, however, may store data on a set of machines, such the computers 210, 230, storage servers or other machines. Each piece of stored data may be replicated, as appropriate. It will be understood that, in alternative embodiments of the invention, the storage module 245 may reside on a computer such as the computer A 210 or may reside elsewhere in a network.

The computer A 210 may include program code associated with a tree data storage structure 215. A node A1 217 and a node A2 219 may be stored in the storage module 245. The computer B 230 may include program code associated with a tree data storage structure 235 as well. A node B1 237 and a node B2 239 may be stored in the storage module 245. Thus computer B 230 may include node information different than the computer A 210. Each node 217, 219, 237, 239 may include one or more keys, and either a pointer or a "unique identifier" as that term is disclosed and used in U.S. patent application Ser. No. 11/149,593 filed on Jun. 10, 2005. One or more of the nodes 217, 219, 237, 239 may additionally include data paired with each key. Alternatively, only leaf nodes (or the nodes on the outermost ends of branches of the structure) may include data-key pairs.

In the distributed system 200, each computer 210, 230 may have access to data associated with nodes on other computers 210, 230. For example, the computer A 210 may have access in this distributed environment system 200 to nodes 237, 239 associated with node information stored on the computer B 230. Communication of such information may take place through the network system 200 by any appropriate method. In this way, for example, the computer A 210 may perform an operation associated with the node B1 237 on the tree data storage structure 235 of the computer B 230. Such operations may include a read operation, in which information associated with the node B1 237 is read at the computer A 210. An operation may be also include a write operation, in which information is written to the node B1 237. Appropriate mechanisms may be employed to coordinate concurrent access to the nodes 217, 219, 237, 239. One such mechanism may use a service to provide coordinated locking of nodes during such accesses.

Figure 3:
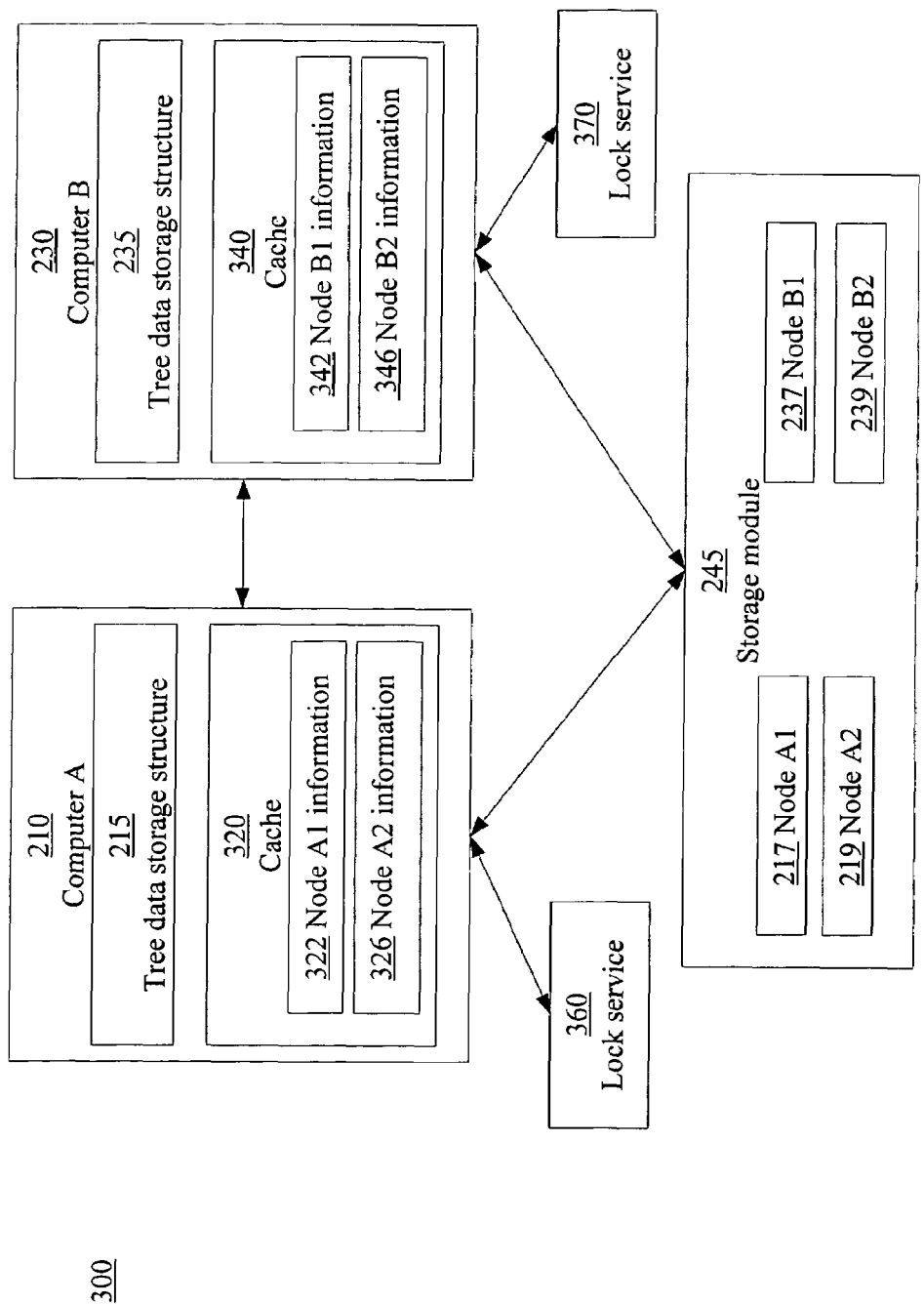
FIG. 3 is a block diagram of an alternative example system for using a tree data storage structure in a distributed environment.

FIG. 3 is a block diagram of an alternative example system 300 for using a tree data storage structure in a distributed environment. The system 300 may include the computer A 210 communicatively coupled with the computer B 230 as described with regard to the system 200 of FIG. 2. As with the system 200, the computers 210, 230 may form or be part of a network, and the network may include other client or server computers (not shown) that may also be implementing a tree data storage structure in the distributed environment.

Additionally, each computer 210, 230 may include a cache 320, 340, respectively, and may be in communication with a lock service 360, 370. In alternative embodiments, the lock service 360, 370 may be located on respective computers 210, 230, on other client computers (not shown), or on other server computers (not shown). The cache 320 on the computer A 210 may include node A1 information 322 and node A2 information 326 associated with, respectively, the nodes 217, 219 stored in the storage module 245. In this way, the computer A 210 may read information stored in or write information to one or more of the nodes 217, 219 on the storage module 245 or to other nodes on the storage module 245. Likewise, the cache 340 on the computer B 230 may include node B1 information 342 and node B2 information 346 associated with, respectively, the nodes 237, 239 stored on the storage module 245. Thus, the computer B 230 may read information stored in or write information to one or more of the nodes 217, 219 or to other node nodes on the storage module 245.

The cache 320, 340 may provide, in conjunction with the lock service 360, 370, an efficient implementation of the tree data storage structure 215, 235 in a distributed environment such as the system 300. While the system 200 described with regard to FIG. 2 is capable of proper implementation of the tree data storage structures 215, 235 in a distributed environment, such implementation may not be optimal because, for example, each time the computer A 210 reads information located in or writes information to the node A1 217, for example, it will be required to retrieve the information from the storage module 245. Such a requirement may slow operations performed by tree data storage structures 215, 235 in a distributed environment. Including, as in the system 300, the ability to cache information associated with any nodes 217, 219, 237, 239 on the computers 210, 230 (or on other client or server computers in the network system 300) may promote operation execution efficiencies.

Thus the cache 320, 340 may include information associated with nodes of tree data storage structures 215, 235, or more specifically, keys, pointers (or unique identifiers), and/or data that are contained in nodes within the distributed system 300. Each cache may operate according to a protocol managed or executed by the lock service 360, 370. The protocol may implement consistency semantics such that each computer 210, 230 (and server computers if applicable) is operating consistently to lock and release nodes that are or are to be cached in multiple locations. In general, the cache 320, 340 acquires a lock from its lock service 360, 370 so that it can cache certain nodes on the respective computer 210, 230.

For example, if the computer A 210 or the tree data storage structure 215 is going to cache information associated with the node A1 217 so that the data therein contained (i.e., a pointer or unique identifier, key, data) may be read or written to, then the lock service 360 may be requested to place a lock on the node A1 217. The lock service 360 may determine the status of the node A1 217 (e.g., whether the node A1 217 is being written to or read by another computer, such as the computer B 230, in the network system 300) and apply a locking semantics protocol to determine if the computer A 210 may acquire a lock on the node A1 217 to read or write to the information therein contained.

Figure 4:
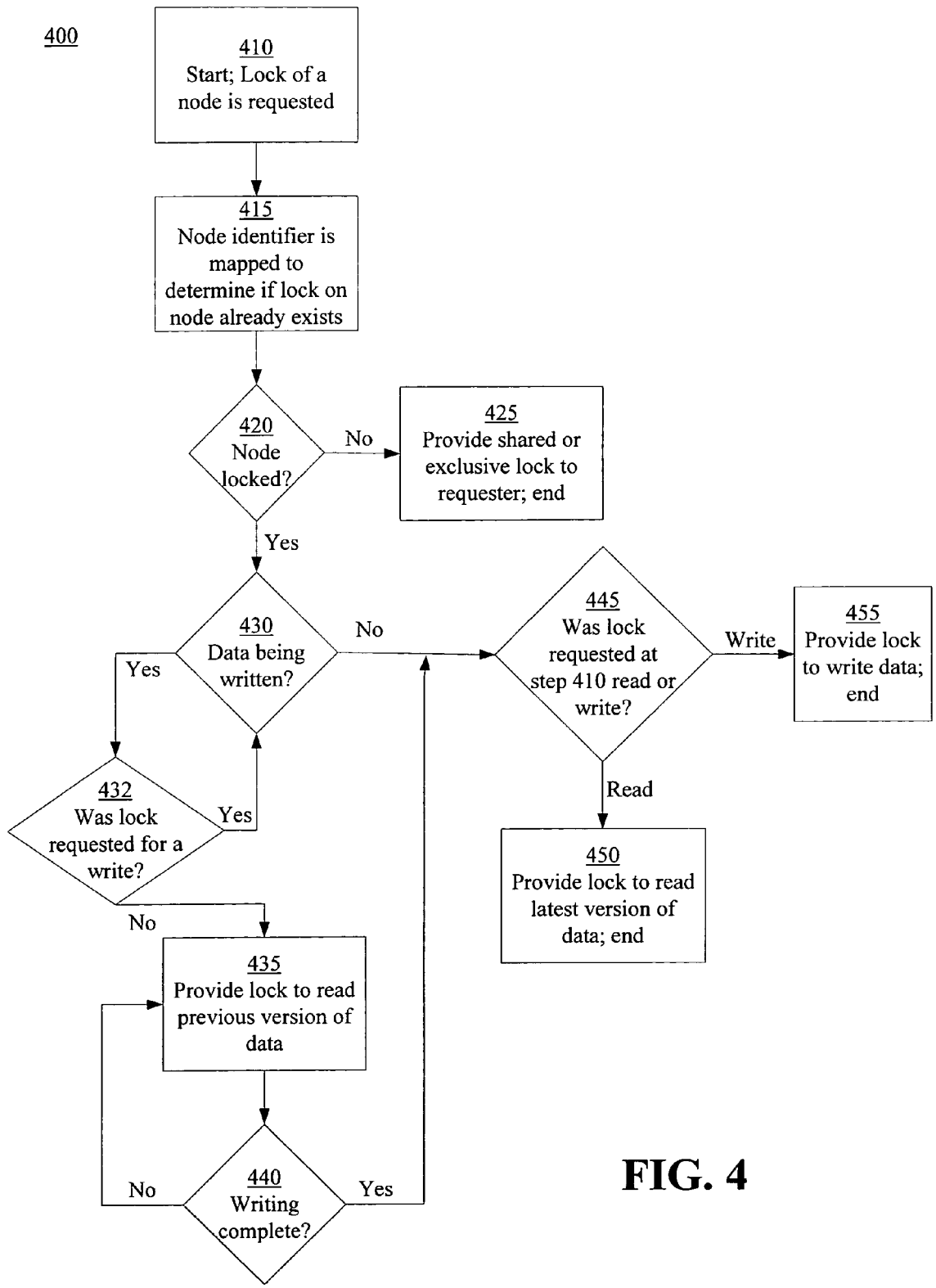
FIG. 4 is a flow diagram of an example method for providing cache coherence associated with a tree data storage structure implemented in a distributed environment.

FIG. 4 is a flow diagram of an example method 400 for providing cache concurrency associated with tree data storage structures implemented in a distributed environment. The method 400 may commence at step 410 with a computer or a tree data storage structure implemented on the computer requesting to acquire a lock of a node. The node may be located within a tree data storage structure implemented on any computer within the applicable distributed environment. At step 415, a lock service or other appropriate entity may determine if the requested node is currently locked. Each node may be mapped to a locked status through use of an identifier to identify each node. An identifier may be a unique number or label that is associated with only one past or present node of a tree data storage structure or of tree data storage structures implemented in a distributed environment. Identifiers are disclosed and described in U.S. patent application Ser. No. 11/149,593 filed on Jun. 10, 2005. The lock service thus may review the mapping to determine if a lock is currently acquired on the requested node. If at step 420, it is determined that a lock is not currently acquired on the node, then at step 425, the requested lock may be provided. The type of lock provided may be the type of lock requested. For example, the type of lock requested may be a shared lock or a lock to read information associated with the node. Alternatively, the type of lock requested may be an exclusive lock so that information may be written to the node. The client computer or the tree data storage structure may then either write to or read, as applicable, the locked node.

If at step 420, a lock is determined to be currently acquired on the node, then at step 430, the lock service may check to determine whether an exclusive lock has been handed out. If an exclusive lock has been handed out, then the lock server may send a revocation request to the holder of the lock, which will wait until a write is completed and release the lock. If at step 432, it is determined that a requested lock was for a write operation, then the method 400 may wait until the current writing is completed and the exclusive lock is released. If at step 432, it is determined that the requested lock was for a read operation, then the lock service may provide a lock to the requesting entity (e.g., the client computer or the tree data storage structure) at step 435 so that information associated with the node as it existed prior to the commencement of the current writing may read. All shared locks may be revoked when a write completes. During a write operation, however, a lock may be acquired so that the requesting entity may read the last version of the information associated with the node as it existed prior to the current writing to the node.

At step 440, the lock service may determine whether data is still being written to the node and if so, the requester continues to retain a lock to read access the prior version of the information associated with the node. When the writing is complete or if the data was not being written to the node when the lock request was made at step 430, then the lock service may determine at step 445 whether the requested lock is to read or to write information to the node. If the requested lock is for reading the data, then at step 450, the lock may be granted for a read of the current version of the data. Such a lock may be a shared lock, allowing other entities desiring to read the information to also obtain a lock. If the request lock was for writing information to the node, then a lock may be acquired by the requesting entity to write data to the node. Such a lock may be an exclusive lock that prevents other entities from obtaining a lock on the data during the writing to the node. Other entities may acquire a lock to read that last version of the information associated with the node (i.e., the information as it existed prior to commencement of the current writing to the node).

The method 400 thus may promote efficiency by enabling data to be read concurrently with data being written to the pertinent node. While the read may not be of the latest version of the information, the latest version of the data may be provided at the next read after the writing is completed. The semantics described with regard to the method 400 may be appropriate for the tree data storage structure algorithm, which may tolerate stale data.

Figure 5:
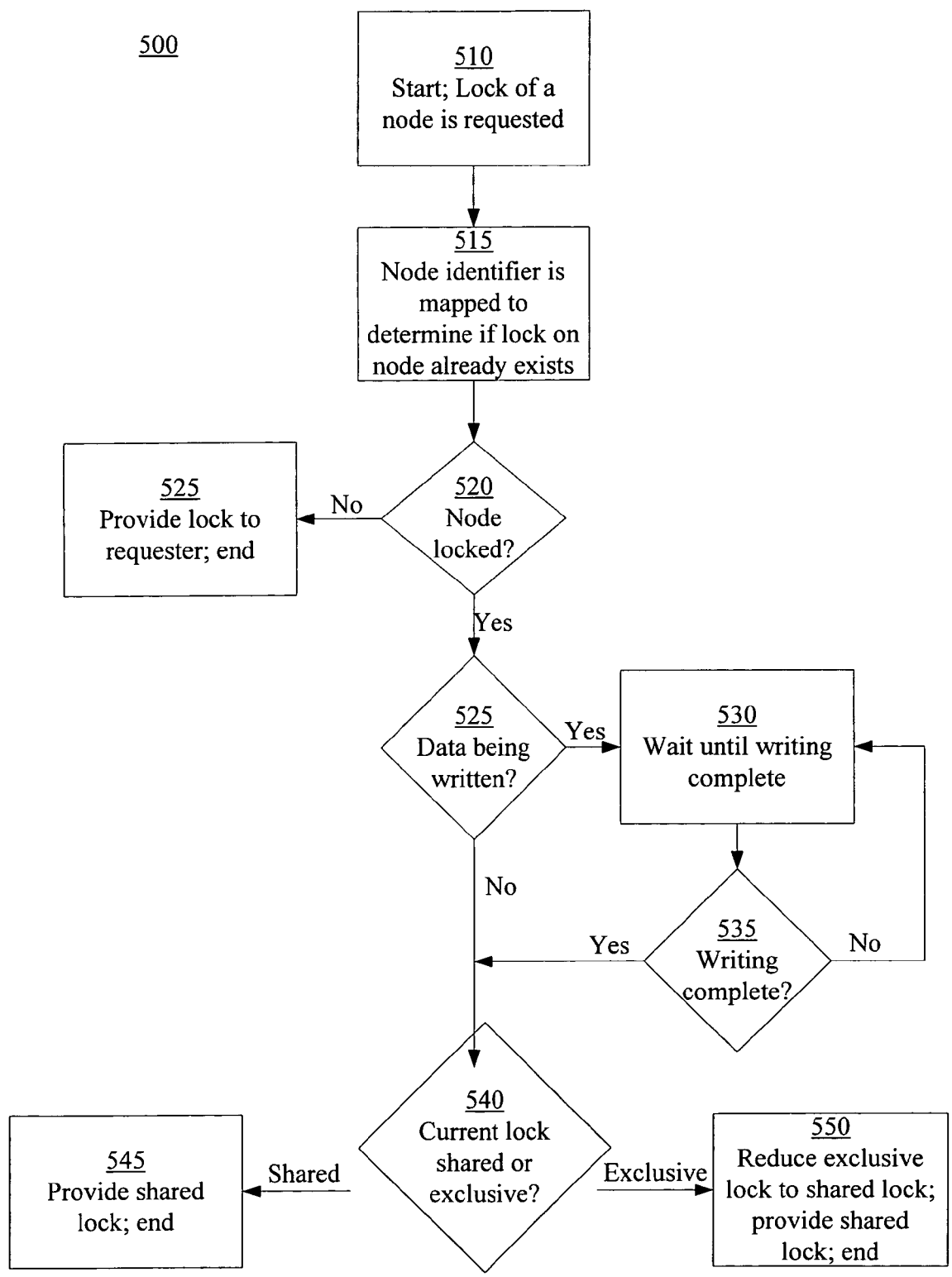
FIG. 5 is a flow diagram of an alternative example method for providing cache concurrency associated with a tree data storage structure implemented in a distributed environment.

FIG. 5 is a flow diagram of an alternative example method 500 for providing cache coherence associated with a tree data storage structure implemented in a distributed environment. The method 500 may commence at step 510 with a client computer or a tree data storage structure requesting a lock of a node. At step 515, a lock service or other appropriate entity may determine if the requested node is currently locked. The lock service or other entity may track locked nodes by mapping each node's unique identifier to a lock and thus may review the mapping to determine if the requested node is locked. If at step 520, the node is determined to not be locked, then at step 525 the lock service may provide the requested lock to the requesting entity (e.g., the client computer or the tree data storage structure).

If at step 520, the requested node is locked, then the lock service may, at step 525, determine if data is being written to the node at the time that the lock is requested. If data is not being written to the node at that time, then the lock service may determine, at step 540, if the current lock on the node is a shared lock or an exclusive lock. A shared lock generally provides authority for the entity holding the lock to read but not to write to the node. An exclusive lock, that is, a lock that prevents any other entity from obtaining any type of lock, provides authority for the entity holding the lock to write information to the node. If the lock service determines that the current lock is a shared lock, then the entity requesting the lock may be provided a shared lock to read data at step 545. If the lock service determines that the current lock is an exclusive lock, then the entity holding the exclusive lock will be provided a shared lock and lose the exclusivity of the lock if the write operation is complete, and the requesting entity will be provided a shared lock at step 550. Thus both the requesting entity and the entity holding the lock originally will both be able to read information associated with the node but will not be able to write information to the node. Additionally, if one or more other client computers desire to read the information associated with the node, more shared locks may be provided.

If instead of a shared lock, the requesting entity desires an exclusive lock (e.g., the requesting entity will write data to the node), then the lock service will remove the lock previously acquired by any other entity and provide the lock to the requesting entity.

Whether the lock service provides a shared or exclusive lock depends on whether data is being written at the time that the lock is requested. Thus, if at step 525, data is currently be written to the requested node, then at step 530, the lock service may wait until the writing is complete before providing any lock to the requesting entity. If at step 535, the writing is complete, then the lock will be provided to the requesting entity in the manner described above with regard to steps 540-550. If the writing is not complete at step 535, then the lock service (and the requesting entity) continues to wait for the writing to be completed.

Thus, the method 500 differs from the method 400 in that the method 500 does not include providing a requesting entity a lock to read a previous version of data while a write operation currently is being performed. Thus, whether implementing the method 400 or the method 500, the cache may include information regarding a node that is more up-to-date than as reflected in the rest of the system. Therefore, in one embodiment of the invention, the caches are of the "write back cache" known to those skilled in the art. Of course, alternative embodiments of the invention may include other types of caches.

The methods of the present invention may be implemented in hardware, software or, where appropriate, a combination of both. Thus, the methods and apparatus of the present invention, or certain aspects or portions thereof, may take the form of program code (i.e., instructions) embodied in computer readable medium. A processor that executes program code for performing the steps of the methods of the invention, as described in FIGS. 2-5 and as claimed, constitute a computer system that embodies the present invention. In the case of program code execution on programmable computers, the computing device will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation of the invention and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed:

1. A computer implemented method of implementing tree data storage structure in a distributed computing environment, comprising:

implementing in memory on a first computer a first tree data storage structure comprising a first node in memory and at least one other node in memory associated with the first tree data storage structure, said first computer comprising program code associated with the first tree data storage structure and first tree node information for the first tree data storage structure;

implementing in memory on a second computer a second tree data storage structure comprising a second node in memory and at least one other node in memory associated with the second tree data storage structure, said second computer comprising program code associated with the second tree data storage structure and second tree node information for the second tree data storage structure, said second tree node information different than the first tree node information, the second computer being communicatively coupled to the first computer;

at the second computer, receiving a request to place a lock on the first node in memory;

at the second computer, obtaining information associated with the first node in memory from the first tree data storage structure;

at the second computer, determining using the information associated with the first node in memory whether an existing lock on the first node in memory has previously been acquired; and at the second computer, upon determining an existing lock on the first node in memory has previously been acquired:

at the second computer, when the existing lock is shared and the requested lock is for a shared lock, placing a shared lock on the first node in memory and reading information from the first node;

at the second computer, when the existing lock is exclusive and the requested lock is for a shared lock, waiting for information to be written to the first node in memory by at least one of the first computer and a third computer and providing access to the first node in memory as existed prior to the exclusive lock while waiting for any ongoing writes to the first node in memory to be completed, and upon any ongoing writes to the first node in memory being completed, changing the existing exclusive lock to a shared lock, providing a shared lock to a current version of the node in memory, and reading the information from the node in memory; and at the second computer, when the existing lock is exclusive and the requested lock is for an exclusive lock, waiting for any ongoing writes to the first node in memory to be complete, removing the existing lock, and placing an exclusive lock on the first node, wherein removing the exclusive lock comprises transmitting a revocation request to the holder of the exclusive lock, wherein at least one of the first and second data tree storage structures is a B-link tree.

2. The method of claim 1, further comprising:
storing the information in a cache of the second computer.

3. The method of claim 2, further comprising:
reading the information.

4. The method of claim 3, wherein reading the information comprises reading the information at the second computer while the information is being written to by at least one of the first and a third computer.

5. The method of claim 4, further comprising:
storing in the cache second information resulting from the information being written to by the at least one of the first and the third computer; and
reading the second information.

6. The method of claim 2, further comprising:
writing to the information at the second computer.

7. A computer-readable storage medium having stored thereon program code executable in a computing system to implement tree data storage structure in a distributed computing environment, the instructions for performing the following:

implementing in memory on a first computer a first tree data storage structure comprising a first node in memory and at least one other node in memory associated with the first tree data storage structure, said first computer comprising program code associated with the first tree data storage and first tree node information for the first tree data storage structure;

implementing in memory on a second computer a second tree data storage structure comprising a second node in memory and at least one other node in memory associated with the second tree data storage structure, said second computer comprising program code associated with the second tree data storage structure and second tree node information for the second tree data storage structure, said second tree node information different than the first tree node information, the second computer being communicatively coupled to the first computer;

at the second computer, receiving a request to place a lock on the first node in memory;

at the second computer, obtaining information associated with the first node in memory from the first tree data storage structure;

at the second computer, determining using the information associated with the first node in memory whether an existing lock on the first node in memory has previously been acquired; and at the second computer, upon determining an existing lock on the first node in memory has previously been acquired:

at the second computer, when the existing lock is shared and the requested lock is for a shared lock, placing a shared lock on the first node in memory and reading information from the first node in memory;

at the second computer, when the existing lock is exclusive and the requested lock is for a shared lock, waiting for information to be written to the first node in memory by at least one of the first computer and a third computer and providing access to the first node in memory as existed prior to the exclusive lock while waiting for any ongoing writes to the first node in memory to be completed, and upon any ongoing writes to the first node in memory being completed, changing the existing exclusive lock to a shared lock, providing a shared lock to a current version of the node in memory, and reading the information from the node in memory; and at the second computer, when the existing lock is exclusive and the requested lock is for an exclusive lock, waiting for any ongoing writes to the first node in memory to be complete, removing the existing lock, and placing an exclusive lock on the first node in memory, wherein removing the exclusive lock comprises transmitting a revocation request to the holder of the exclusive lock, wherein at least one of the first and second data tree storage structures is a B-link tree.

8. The computer-readable storage medium of claim 7, having further stored thereon program code executable by the computer systems to perform the following:
storing the information in a cache of the second computer.

9. The computer-readable storage medium of claim 8, having further stored thereon program code executable by the computer systems to perform the following:
acquiring at the second computer a lock on the first node in memory prior to storing the information in the cache.

10. The computer-readable storage medium of claim 9, having further stored thereon program code executable by the computer systems to perform the following:
reading the information at the second computer while the information is being written to by at least one of the first and a third computer.

11. A system for implementing tree data storage structure in a distributed computing environment, comprising:

computing memory in a first computer comprising a first tree data storage structure in B-link tree format comprising a first node in memory and at least one other node in memory associated with the first tree data storage structure, said first computer comprising program code associated with the first tree data storage structure and first tree node information for the first tree data storage structure;

means for obtaining information associated with a node of a second tree data storage structure in B-link tree format implemented on a second computer, said second tree data storage structure comprising a second node in memory and at least one other node in memory associated with the second tree data storage structure, said second computer comprising program code associated with the second tree data storage structure and second tree node information for the second tree data storage structure, said second tree node information different than the first tree node information;

means for performing an operation that is associated with both the first tree data storage structure and the information;

a cache;

means for storing the information in the cache; and means for acquiring a lock on the node of the second tree data storage structure, said means for acquiring a lock comprising a unique identifier for each node in the first tree data storage and the second tree data storage, wherein said means for acquiring a lock on the node is configured to:

receive at the second computer a request to place a lock on the first node in memory;

at the second computer, obtain information associated with the first node in memory from the first tree data storage structure;

at the second computer, determine using the information associated with the first node in memory whether an existing lock on the first node has previously been acquired;

determining whether the existing lock is a read lock and upon determining that the existing lock is a read lock providing access to the requester to read prior versions of information associated with the first node during simultaneous writing to the first node; and at the second computer, upon determining an existing lock on the first node in memory has previously been acquired:

at the second computer, when the existing lock is shared and the requested lock is for a shared lock, place a shared lock on the first node in memory and read information from the first node in memory;

at the second computer, when the existing lock is exclusive and the requested lock is for a shared lock, provide access to the first node in memory as the first node in memory existed prior to the exclusive lock while waiting for any ongoing writes to the first node in memory to be completed, and upon any ongoing writes to the first node in memory being completed, change the existing exclusive lock to a shared lock, provide a shared lock to a current version of the node in memory, and read the information from the node in memory; and at the second computer, when the existing lock is exclusive and the requested lock is for an exclusive lock, wait for any ongoing writes to the first node in memory to be complete, remove the existing lock, and place an exclusive lock on the first node in memory, wherein removing the exclusive lock comprises transmitting a revocation request to the holder of the exclusive lock.

* * * * *